May 27, 1952  T. E. McCORMICK  2,598,007
ANIMAL TRAP
Filed July 24, 1950  2 SHEETS—SHEET 1
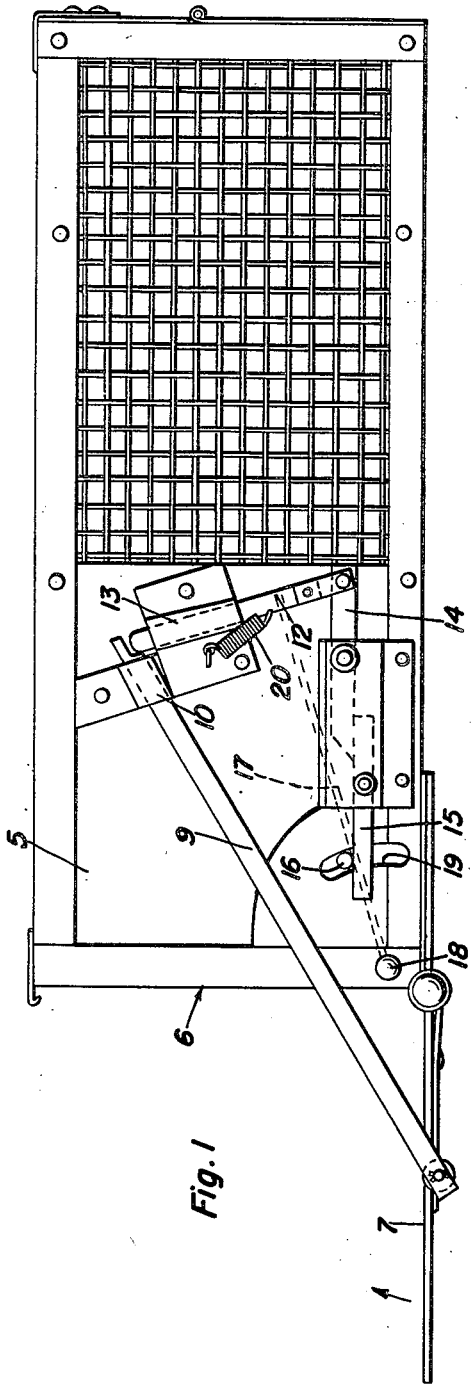
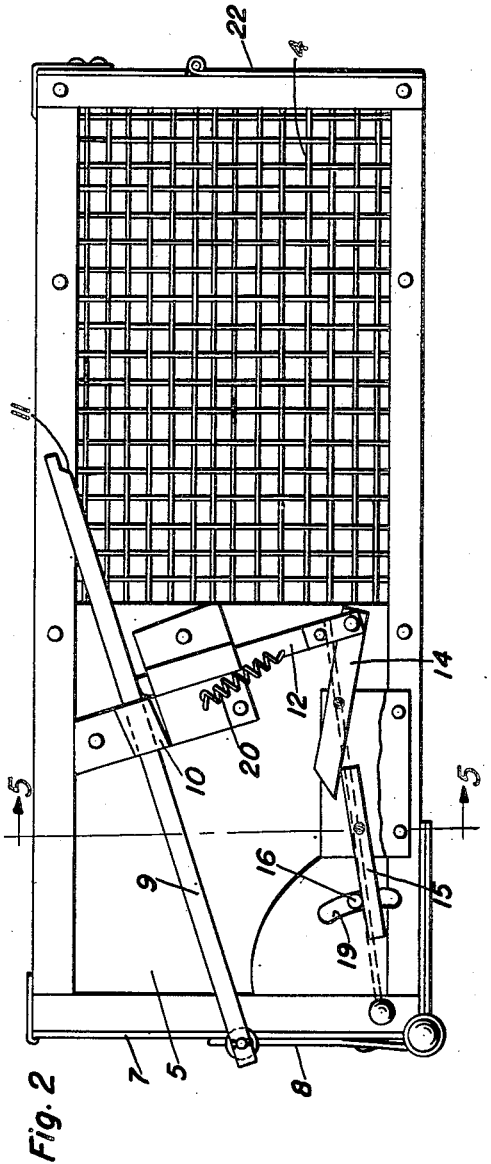
Thomas E. McCormick
INVENTOR.

May 27, 1952 T. E. McCORMICK 2,598,007
ANIMAL TRAP
Filed July 24, 1950 2 SHEETS—SHEET 2
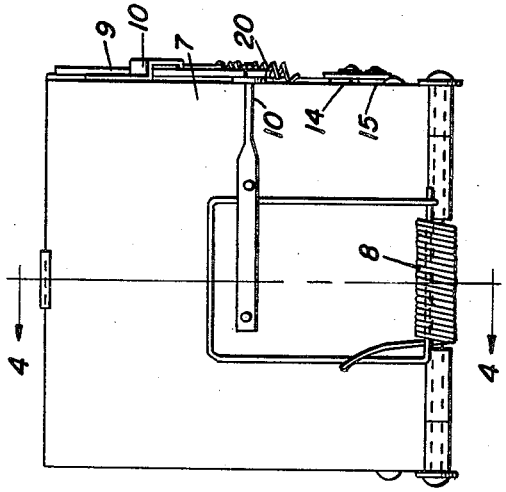
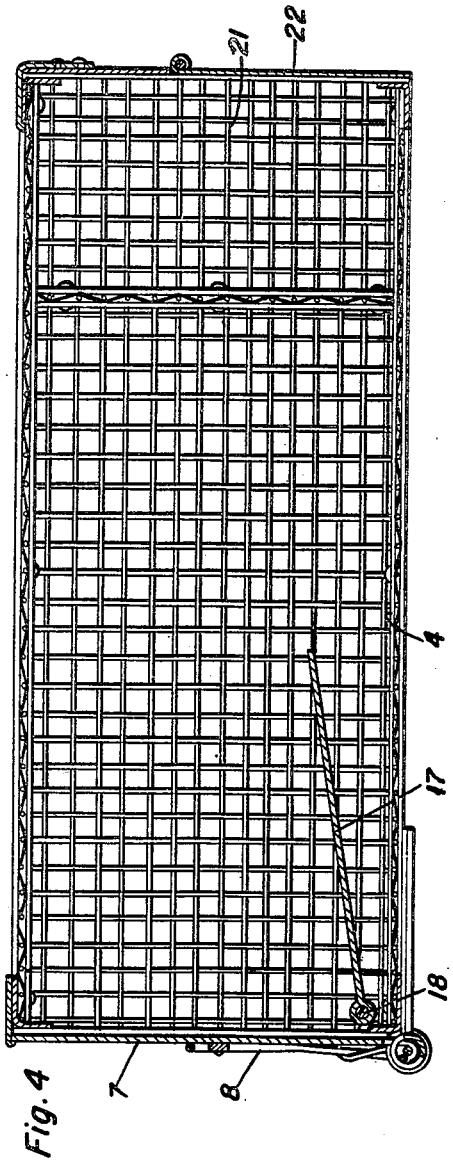
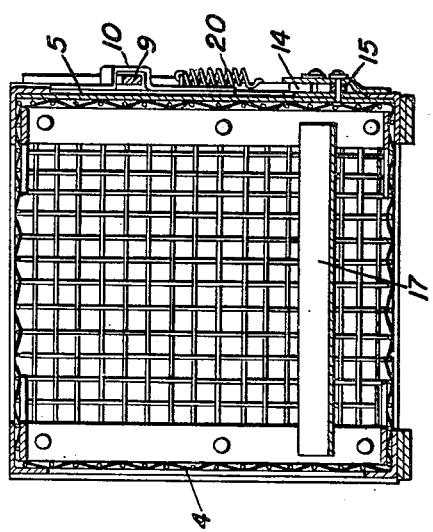
Thomas E. McCormick
INVENTOR.

Patented May 27, 1952

2,598,007

UNITED STATES PATENT OFFICE 2,598,007

ANIMAL TRAP

Thomas E. McCormick, Florence, Ala.

Application July 24, 1950, Serial No. 175,627

1 Claim. (Cl. 43—61)

The present invention relates to new and useful improvements in animal traps and more particularly to traps for catching animals without injury thereto.

An important object of the invention is to provide a cage having a spring actuated door and novel animal actuated trip means holding the door in open position and in which the trip means is set by the opening of the door.

Another object is to provide animal actuated trip means for the door constructed for also easily and conveniently actuating the trip by hand.

A further object is to provide an animal trap of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing the trap set;

Figure 2 is a similar view showing the trap sprung;

Figure 3 is a front elevational view;

Figure 4 is a longitudinal sectional view taken on a line 4—4 of Figure 3; and

Figure 5 is a transverse sectional view taken on a line 5—5 of Figure 2.

Referring now to the drawings in detail, wherein, for the purpose of illustration, I have disclosed a preferred embodiment of my invention, the numeral 4 designates a cage of suitable reticulated material and of rectangular shape and having an entrance 6 at one end provided with a door 7 hinged at its lower edge to the bottom of the cage for upward swinging closing movement. A wire spring 8 closes the door. The cage is constructed with a sheet metal panel 5 at one side adjacent the entrance.

A bar 9 is slidable in a guide 10 secured to the panel and with one end of the bar pivoted to a lateral pin 10 projecting from one edge of the door and the other end of the bar is formed with a shoulder or notch 11 at its lower edge.

A trip bar 12 is slidable vertically in a guide 13 integrally formed with guide 10 and with the upper end of bar 12 engageable with the shoulder or notch 11 and pivoted at its lower end to the rear end of a rear trip lever 14 which is pivoted to the panel 5. The front end of lever 14 overlies the rear end of a front trip lever 15 also pivoted to the panel and with its front end underlying a pin 16 projecting laterally from one edge of an animal actuated ramp or platform 17 pivoted at its front edge on a pin 18 positioned transversely of the cage at the lower portion of entrance 6. Pin 16 works in an arcuate slot 19 in the panel and may be manually operated.

A coil spring 20 is attached to the guide 13 and is connected to bar 12 to hold the same upwardly in position for engaging shoulder or notch 11 and to hold levers 14 and 15 horizontal, as shown in Figure 1.

The rear portion of the cage is formed with a bait compartment 21 having a rear door 22.

In the operation of the device, door 7 is swung downwardly into open position pulling bar 9 forwardly until the upper end of trip bar 12 engages shoulder or notch 11 of bar 9 to thus hold the door in open position.

The weight of an animal entering the cage lowers ramp or platform 17, causing pin 16 to rock front lever 15 and which in turn rocks rear lever 14 to swing the rear end of the rear lever downwardly and pulling bar 12 downwardly to release bar 9. Spring 8 then closes the door to trap the animal.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A trap comprising an elongated cage having an entrance opening in one end, a spring closed door for the opening, an animal actuated platform pivotally mounted in the cage, a metallic plate on one side of the cage, said plate having an arcuate slot therein, integral guides mounted on the plate at substantially right angles to each other, a holding bar pivotally connected to the door and slidable in one of the guides and having a notch in its free end portion, a trip bar slidable in the other guide and engageable in the notch for releasably securing the door in open position, a lateral pin on the platform operable in the slot, a trip lever pivotally mounted on the plate and operable by the pin, a second trip lever on the plate operatively connecting the first named lever to the trip bar, and a spring yieldingly engaging said trip bar in the notch of the door holding bar.

THOMAS E. McCORMICK.

REFERENCES CITED

The following references are of record in the file of this patent:

UNITED STATES PATENTS

| Number | Name | Date |
|---|---|---|
| 610,755 | Carpenter | Sept. 13, 1898 |